(12) United States Patent
Masuda et al.

(10) Patent No.: US 6,510,255 B2
(45) Date of Patent: Jan. 21, 2003

(54) OPTICAL TRANSMISSION APPARATUS

(75) Inventors: Kouichi Masuda, Hirakata (JP); Hiroaki Yamamoto, Higashiosaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 90 days.

(21) Appl. No.: 09/741,435

(22) Filed: Dec. 21, 2000

(65) Prior Publication Data

US 2001/0005437 A1 Jun. 28, 2001

(30) Foreign Application Priority Data

Dec. 24, 1999 (JP) .......................................... 11-367166

(51) Int. Cl.[7] .......................... G02F 1/035; G02F 1/01; H01S 3/10; H01S 3/13
(52) U.S. Cl. ................. 385/2; 385/1; 372/21; 372/28; 372/29.01
(58) Field of Search ................ 385/1–3, 122; 372/21, 28, 29.01

(56) References Cited

U.S. PATENT DOCUMENTS 5,218,468 A * 6/1993 Shaw ......................... 359/245
5,253,309 A * 10/1993 Nazarathy et al. ............. 385/1
5,278,923 A * 1/1994 Nazarathy et al. ............. 385/1
5,359,449 A * 10/1994 Nishimoto et al. .......... 359/181
5,400,417 A 3/1995 Allie et al. ..................... 385/2
6,320,692 B1 * 11/2001 Notargiacomo ............. 359/239

FOREIGN PATENT DOCUMENTS

| JP | 5-249418 | 9/1993 |
| JP | 8-248366 | 9/1996 |

* cited by examiner

Primary Examiner—Georgia Epps
Assistant Examiner—Jack Dinh
(74) Attorney, Agent, or Firm—Wenderoth, Lind & Ponack, L.L.P.

(57) ABSTRACT

In an optical transmission apparatus including an external optical modulator for modulating an optical carrier from a light source with an electrical signal, bias voltage applied to the external optical modulator is accurately adapted to fluctuations in optimal bias voltage due to DC drift. A bias voltage control circuit controls bias voltage applied by a bias voltage applier to an external optical modulator so as to minimize an amount of second order distortion included in an optical signal from the external optical modulator and caused by non-linearity thereof.

6 Claims, 13 Drawing Sheets

OPTICAL TRANSMISSION APPARATUS

BACKGROUND OF THE INVENTION

1. Field of the Invention

The present invention relates to optical transmission apparatuses and, more specifically, to an optical transmission apparatus using an external optical modulator. The apparatus is capable of controlling a bias voltage applied to the external optical modulator for making the bias voltage follow a shift in optimal bias voltage caused by DC drift.

2. Description of the Background Art

In optical transmission apparatuses used in conventional optical communications systems, conventionally adopted is a modulation scheme of directly modulating an electric current fed to a laser diode constructing a light source with an input signal and outputting an optical signal modulated with the input signal. In this modulation scheme, the current fed to the laser diode changes, and therefore, an optical signal from the laser diode changes in oscillation wavelength due to its chirp characteristics. If transmitted over a long distance, the optical signal outputted from such laser diode is deteriorated in waveform under the influence of chromatic dispersion within an optical fiber.

For future mobile communications, high frequencies, especially, extremely high frequencies (millimeter-wave band), will be used for substantially increasing transmission rate, because band reservation can be made easily in these frequencies. However, if signals in the millimeter-wave band are transmitted through a coaxial cable, a large loss will be caused. Thus, in this case, amplifiers are required at several tens-of-millimeter intervals. This requirement poses problems in view of cost and reliability for actual system configuration. Therefore, for millimeter-wave band signal transmission, use of optical fibers with less transmission loss is required. However, laser diodes now commercially available have frequency response characteristics of around 10 GHz, and thus cannot respond to signals of extremely high frequency. For this reason, such laser diodes cannot be directly modulated by the millimeter-wave signals.

Therefore, for long-distance transmission or transmission of signals of high frequency such as millimeter waves, an optical transmission apparatus having a Mach-Zehnder-type external optical modulator is, in principle, less prone to cause chirp and capable of responding to signals of higher frequency has been suggested for use.

FIG. 11 shows the structure of a Mach-Zehnder-type external optical modulator (hereinafter referred to as MZ-type optical modulator). An optical carrier outputted from a light source is provided to the MZ-type optical modulator, and branched to two optical waveguides. When a voltage is applied to electrodes provided on a crystal substrate to cause an electric field, the index of refraction in the waveguides is changed. As a result, the lights propagated through the waveguides are changed in phase. Note that shown in FIG. 11 is such structure that only the light through one optical waveguide is phase-modulated. The lights from these optical waveguides are combined with each other, and outputted as an optical signal from a MZ-type optical modulator. The optical electric field of the outputted optical signal is represented by the following equation (1).

$$E_{Ex-Mod}(V, t) = \frac{1}{\sqrt{2}}\exp(i\omega t) + \frac{1}{\sqrt{2}}\exp i[\{\omega t + \phi(V, t)\}] \quad (1)$$

$$= \frac{1}{\sqrt{2}}\exp\left\{i\left(\omega t + \frac{\phi(V, t)}{2}\right)\right\}\exp\left\{-\frac{i\phi(V, t)}{2}\right\} +$$

$$\frac{1}{\sqrt{2}}\exp\left\{i\left(\omega t + \frac{\phi(V, t)}{2}\right)\right\}\exp\left\{\frac{i\phi(V, t)}{2}\right\}$$

$$= \frac{1}{\sqrt{2}}\exp\left\{i\left(\omega t + \frac{\phi(V, t)}{2}\right)\right\}\left[\exp\left\{-\frac{i\phi(V, t)}{2}\right\} + \exp\left\{\frac{i\phi(V, t)}{2}\right\}\right]$$

$$= \sqrt{2}\cos\{\phi(V, t)/2\}\exp\left\{i\left(\omega t + \frac{\phi(V, t)}{2}\right)\right\}$$

provided that $$\phi(V, t) = \phi_{DC}(V) + \phi_{RF}(t) \quad (2)$$

$$= \phi_{DC}(V) + m\cos\omega_f t$$

where V is a bias voltage, m is a phase modulation factor, and ωf is angular frequency of an analog signal. By using this optical electric field, power of the optical signal outputted from the MZ-type optical modulator is given by the following equation (3).

$$P_{out} = E_{Ex-Mod}(V, t) \times E^*_{Ex-Mod}(V, t) \quad (3)$$

$$= 2\cos^2(\phi(V, t)/2)$$

$$= S1 + \cos\phi(V, t)$$

$$= 1 + \cos(\phi_{DC}(V) + m\cos\omega_f t)$$

$$= 1 + \cos\phi_{DC}(V)\cos(m\cos\omega_f t) - \sin\phi(V)\sin(m\sin\omega_f t)$$

$$= 1 + \cos\phi_{DC}(V)\{J_0(m) + 2J_2(m)\cos(2\omega_f t) + \ldots\} -$$

$$\sin\phi_{DC}(V)\{2J_1(m)\cos(\omega_f t) + 2J_3(m)\cos(3\omega_f t) + \ldots\}$$

At this time, a relation between a bias voltage and an optical output is shown in FIG. 12. In FIG. 12, the lateral axis represents the bias voltage, while the vertical axis represents optical output power. As such, the power of the optical signal outputted from the MZ-type optical modulator exhibits a sine-wave characteristic with respect to the bias voltage applied to the MZ-type optical modulator.

However, in the MZ-type optical modulator, the above relation between the bias voltage and the optical output may be varied with various conditions, such as time and temperature. Such phenomenon is called DC drift. This DC drift phenomenon is shown in FIG. 13.

Such DC drift phenomenon as shown in FIG. 13 causes a shift in phase state from an initial state. Accordingly, average power of the optical signal outputted from the MZ-type optical modulator is changed, thereby causing deterioration in signal characteristic. Note that the bias voltage at the initial phase state (where the amount of second order distortion caused by non-linearity of the external modulator is minimum) is hereinafter referred to as an optimal bias voltage (denoted by Vb in the drawing).

In the conventional optical transmission apparatus using the external optical modulator, the bias voltage applied to the external optical modulator is controlled based on the average power of the optical signal outputted from the external optical modulator so that the bias voltage can be made to follow the shift in the optimal bias voltage caused by DC drift. The average power can be calculated by converting the optical signal into an electrical signal and measuring DC components of the electrical signal, that is, electric power.

More specifically, in the initial state in which the bias voltage is optimally set, average power of the output optical signal is measured in advance, and stored as a reference value. Thereafter, the applied bias voltage is controlled so that the average power of the output optical signal agrees with the reference value.

However, compared with the shift in the applied bias voltage from the optimal bias voltage, a change in the average power of the output optical signal is extremely small. Therefore, it is very difficult to make the applied bias voltage accurately follow the shift in the optimal bias voltage based on the average power of the output optical signal.

Here, described is a relation between a shift in the applied bias voltage from the optimal bias voltage and a change in the average power of the output optical signal by using equations.

Average power of the output optical signal Pdc can be represented by the following equation (4) with the use of the result of the above equation (3).

$$P_{dc} = 1 + J_0(m) \cos(\phi(V)) \tag{4}$$

In general, the optimal bias voltage is obtained when the initial phase state is $\pi/2$. If a change in phase caused by the bias voltage being shifted due to DC drift is $\phi$, the phase state at this time can be represented by the following equation (5).

$$\phi(V) = \frac{\pi}{2} + \Psi(V) = \frac{\pi}{2} + \frac{2}{\pi}\frac{V}{V_\pi} \tag{5}$$

From the above equations (4) and (5), the amount of change in the average power of the output optical signal with respect to the shift in the applied bias voltage from the optimal bias voltage can be obtained by the following equation (6).

$$dP_{dc} = J_0 \sin\phi(V) d\phi \tag{6}$$
$$= \frac{2J_0}{\pi}\frac{1}{V}\sin\phi(V)d\phi$$

where $$d\phi = \frac{2}{\pi}\frac{1}{V_\pi}dV \tag{7}$$

An instantaneous shift in bias voltage caused by DC drift is extremely small. Therefore, $$\phi(V) \approx \frac{\pi}{2} \tag{8}$$

and thus approximated at $$\sin\phi(V) \approx 0 \tag{9}$$

As evident from the above, the change in the average power of the optical signal is extremely small with respect to the change in phase. Therefore, only a slightest change in the average power can be observed with respect to the shift in the applied bias voltage from the optimal bias voltage. It is thus difficult, as in the conventional art, to increase control accuracy if the bias voltage is controlled based on the average power of the output optical signal.

Low accuracy of controlling the bias voltage presents no problem for transmission of baseband digital signals. However, for transmission of analog signals, especially frequency division multiplexed signals, even a slight fluctuation in bias voltage can increase second order distortion (second order intermodulation distortion=IM2).

FIG. 14 is a diagram showing the relation between the bias voltage applied to the external optical modulator of FIG. 11 and the amount of second order distortion (hereinafter referred to as the amount of distortion) included in the optical signal outputted from the external optical modulator and caused by non-linearity thereof. As shown in FIG. 14, the amount of distortion exhibits a symmetric characteristic with respect to an axis representing the optimal bias voltage (Vb in the drawing). The amount of distortion becomes minimum when the bias voltage is equal to the optimal bias voltage, while surging when shifted therefrom even by a slightest amount.

The relation between the bias voltage and the amount of distortion is described below by using equations. When an analog signal provided to the external optical modulator has two frequencies, power of an output light from the external optical modulator can be represented by the following equation (10)

$$P_{out} = 1 + \cos(\phi_{DC}(V) + m\sin\omega_1 t + m\sin\omega_2 t) = \tag{10}$$

$$1 + \cos\phi_{DC}(V)\begin{bmatrix} J_0^2(m) + 2J_1^2(m)\{\sin(\omega_1+\omega_2)t + \sin(\omega_1-\omega_2)t\} + \\ 2J_0(m)J_2(m)\{\cos 2\omega_1 t + \cos 2\omega_2 t\} + \\ 2J_2^2(m)\{\cos 2(\omega_1+\omega_2)t + \cos 2(\omega_1-\omega_2)t\} \end{bmatrix} -$$

$$\sin\phi_{DC}(V)\begin{bmatrix} 2J_0(m)J_1(m)\{\sin\omega_1 t + \sin\omega_2 t\} + \\ 2J_1(m)J_2(m)\{\sin(\omega_1+2\omega_2)t + \sin(2\omega_1+\omega_2)t\} + \\ 2J_1(m)J_2(m)\{\sin(2\omega_1+\omega_2)t + \sin(2\omega_2+\omega_1)t\} \end{bmatrix}$$

where $\omega 1$ and $\omega 2$ are angular frequencies of the analog signal.

In the above equation (10), the term including $\omega 1$ or $\omega 2$ represents the analog signal, while the other terms represent distortion components caused by non-linearity of the external optical modulator. Here, the ratios of IM2 and IM3 (third order intermodulation distortion) to the analog signal are represented by the following equations (11) and (12), respectively.

$$IM_2 = 20\log\{2J_0(m)J_1(m)\sin\phi_{DC}(V)/2J_1^2(m)\cos\phi_{DC} \quad (11)$$
$$= 20\log\left\{\frac{J_1(m)\cos\phi_{DC}(V)}{J_0(m)\sin\phi_{DC}(V)}\right\}$$

$$IM_3 = 20\log\{2J_2(m)J_1(m)\sin\phi_{DC}(V)/2J_1(m)J_0(m)\sin\phi_{DC}(V)\} \quad (12)$$
$$= 20\log\{J_2(m)/J_0(m)\}$$

As evident from the above equations (11) and (12), IM2 depends on the bias voltage and a phase modulation factor, while IM3 on the phase modulation factor. On the other hand, in the initial state, the bias voltage applied to the external optical modulator is set to the optimal bias voltage Vb. That is, the relation between the bias voltage and the phase satisfies the following equation (13).

$$\phi_{DC}(V_b) = \frac{\pi}{2} \quad (13)$$

Here, as can be seen from the above equation (11), IM2 does not occur.

Thereafter, however, the relation between the bias voltage and the phase fails to satisfy the above equation (13) due to a DC-drift characteristic of the external optical modulator. Here, a phase shift due to DC drift and the amount of distortion resulting therefrom are calculated in the following manner.

When the bias voltage V is shifted from the optimal bias voltage Vb by V, φDC can be represented by the following equation (14).

$$\phi_{DC}(V_b - \Delta V) = \frac{\pi}{2}\left(1 - \frac{\Delta V}{V_\pi}\right) \quad (14)$$

where Vπ represents a switching voltage of the external optical modulator.

The above equation (14) can be represented by using a phase shift Δx (%) as the following equation (15).

$$\phi_{DC}(\Delta x) = \frac{\pi}{2}\left(1 - \frac{\Delta x}{100}\right) \quad (15)$$

By substituting the equation (15) into the above equation (11), IM2 and CSO (composite second order distortion) with respect to the shift in phase of the bias voltage from the optimal bias voltage are calculated. In these calculations, m=0.04. To convert IM2 into CSO, the maximum composite number is taken as 60 at the time of 60 ch transmission for power addition. The calculation results are shown in FIG. 15.

At analog 60-ch transmission, required technical specifications are that CSO should be below −60 dBc. To satisfy such requirement, as evident from FIG. 15, the shift in the bias voltage from the optimal bias voltage should be limited to approximately ±0.03% at maximum. Such accurate control cannot be made by monitoring changes in the average power of the optical signal.

SUMMARY OF THE INVENTION

Therefore, an object of the present invention is to provide an optical transmission apparatus including an external optical modulator that modulates an optical carrier from a light source with an electrical signal. The optical transmission apparatus according to the present invention is capable of making a bias voltage applied to the external optical modulator accurately follow a shift in the optimal bias voltage caused by DC drift. As a result, even if DC drift occurs due to variations with time or temperature, a change in the average power of the optical signal outputted from the external optical modulator and an increase in distortion included in the optical signal can be suppressed. Thus, the optical transmission apparatus with a stable transmission characteristic can be achieved.

The present invention has the following features to achieve the object above.

A first aspect of the present invention is directed to an optical transmission apparatus for externally modulating an optical carrier with an electrical signal for transmission. The apparatus comprises a light source for outputting the optical carrier an external optical modulator for modulating the optical carrier outputted from the light source with the electrical signal; a bias voltage applier for applying a bias voltage to the external optical modulator; and a bias voltage controller for controlling the bias voltage applied by the bias voltage applier to the external optical modulator based on an amount of second order distortion included in an optical signal from the external optical modulator and caused by non-linearity thereof.

In the above first aspect, the bias voltage applied to the external optical modulator (hereinafter referred to as applied bias voltage) is controlled based on the amount of second order distortion included in the optical signal from the external optical modulator and caused by non-linearity thereof. Therefore, the applied bias voltage can be made to more accurately follow the shift in the optimal bias voltage due to DC drift. As a result, even if DC drift occurs due to variations with time or temperature, it is possible to suppress a shift in the average power of the optical signal outputted from the external optical modulator and an increase in distortion included in the optical signal. Thus, an optical transmission apparatus with a stable transmission characteristic can be achieved.

Here, a shift in distortion with respect to a shift in bias voltage is described by using equations. Second order distortion (IM2) is represented by the above equation (11), and a value of an antilogarithm thereof is represented by the following equation (16).

$$IM_2 = \left(\frac{J_1}{J_0}\right)^2 \left\{\frac{\cos\phi_{DC}(V)}{\sin\phi_{DC}(V)}\right\}^2 \quad (16)$$

By partial differentiation of the above equation (16), the shift in IM2 with respect to the shift in bias voltage can be obtained as shown in the following equation (17).

$$dIM_2 = \left(\frac{J_1}{J_0}\right)^2 \frac{\cos\phi_{DC}(V)\sin^2\phi_{DC}(V)\frac{2}{\pi V_\pi}dV - 2\cos^2\phi_{DC}(V)\frac{2}{\pi V_\pi}dV}{(\sin\phi_{DC}(V))^3} \quad (17)$$
$$= \frac{2}{\pi V_\pi}\left(\frac{J_1}{J_0}\right)^2 \frac{\cos\phi_{DC}(V)\sin^2\phi_{DC}(V) - 2\cos^3\phi_{DC}(V)}{(\sin\phi_{DC}(V))^3}dV$$

Compared with the shift in IM2 with respect to the shift in bias voltage from the optimal bias voltage, the average power of the optical signal with respect to the same is approximately 0 as shown in the above equation (6). On the other hand, the shift in IM2 becomes infinite as shown in the above equation (17). This can be clearly understood if FIGS. 12 and 14 are compared with each other in the gradient of each curve in the vicinity of the optimal bias voltage. Therefore, the bias voltage can be controlled more accurately by monitoring the amount of distortion included in the optical signal than by monitoring the average power of the optical signal.

According to a second aspect of the present invention, in the first aspect, the bias voltage controller includes: an optical branching unit for branching the optical signal from the external optical modulator into two optical signals; an optical-electrical converter for converting one optical signal from the optical branching unit into an electrical signal; a distortion detector for detecting the amount of second order distortion included in the optical signal from the external optical modulator and caused by the non-linearity thereof by extracting a component in a specific band from the electrical signal provided by the optical-electrical converter and measuring a level of the component; and a bias voltage control circuit for controlling the bias voltage applied by the bias voltage applier to the external optical modulator so as to minimize the amount of second order distortion detected by the distortion detector.

In the second aspect, the applied bias voltage is controlled to minimize the amount of distortion.

According to a third aspect of the present invention, in the second aspect, the bias voltage control circuit increases or decreases the bias voltage applied by the bias voltage applier to the external optical modulator, and determines whether the second order distortion detected by the distortion detector is increased or decreased before and after increasing or decreasing the bias voltage, and further determines, based on a determination result, whether to increase or decrease the bias voltage next time.

Here, the amount of distortion exhibits a symmetric characteristic with respect to an axis representing the optimal bias voltage (refer to FIG. 14). Therefore, if the optimal bias voltage is shifted due to DC drift, it should be determined whether to increase or decrease the applied bias voltage.

Therefore, in the third aspect, the applied bias voltage is first increased or decreased. Then, it is determined whether the amount of distortion has been increased or decreased. Based on the determination result, it is determined whether to increase or decrease the bias voltage next time. More specifically, if the amount of distortion is decreased as the applied bias voltage is increased (or decreased), the bias voltage is allowed to be further increased (or decreased), and if increased, the bias voltage is controlled in reverse, that is, decreased (or increased) next time.

Alternatively, as in a fourth aspect of the present invention, which will be described later, the average power of the optical signal outputted from the external optical modulator is further detected. It may be determined, based on the optical average power, whether to increase or decrease the applied bias voltage. More specifically, if the bias voltage applied to the external optical modulator and the average power of the optical signal outputted therefrom has a relation as shown in FIG. 12, the applied bias voltage is increased when the optical average power is increased, while decreased when decreased.

Alternatively, in a fifth aspect of the present invention, which will be described later, if the external optical modulator has two output ports (first and second ports), the amount of second order distortion included in the optical signal from the second port is detected. The applied bias voltage is controlled so that the detected amount of distortion agrees with a reference value. The reference value is, preferably as in a sixth aspect, a value of the amount of distortion detected by the distortion detector (the amount of distortion included in an optical signal from the second port side) when the bias voltage for minimizing the amount of second order distortion included in an optical signal from the first port (the optimal bias voltage in the first port side) is applied to the external optical modulator.

According to the fourth aspect, in the second aspect, the bias voltage controller further includes an optical power detector for detecting average optical power of the optical signal from the external optical modulator by measuring electrical power of the electrical signal from the optical-electrical converter, and the bias voltage control circuit determines, based on the average optical power detected by the optical power detector, whether to increase or decrease the bias voltage applied by the bias voltage applier to the external optical modulator.

According to the fifth aspect, in the first aspect, the external optical modulator includes: two waveguides for branching the optical carrier from the light source into two optical signals for guiding; an optical coupler for coupling the optical signals guided by the waveguides; and first and second ports for outputting the two optical signals from the optical coupler. Also, the bias voltage controller includes: an optical-electrical converter for converting the optical signal from the second port into an electrical signal; a distortion detector for detecting an amount of second order distortion included in the optical signal from the second port and caused by non-linearity of the external optical modulator by extracting a component in a specific band from the electrical signal outputted from the optical-electrical converter and measuring a level of the component; and a bias voltage control circuit for controlling the bias voltage applied by the bias voltage applier to the external optical modulator so that the amount of second order distortion detected by the distortion detector agrees with a previously-stored reference value.

In the above fourth and fifth aspects, whether to increase or decrease the applied bias voltage can be quickly recognized. Therefore, the applied bias voltage can be made to follow the shift in the optimal bias voltage due to DC drift quickly and accurately.

Note that in the fourth aspect, whether to increase or decrease the applied bias voltage is determined based on an increase or decrease in the average power of the output light. On the other hand, in the fifth aspect, this is determined based on the amount of distortion in the second port side. Therefore, only the amount of distortion in the second port side is required to be monitored, and thus the apparatus can be made simple in structure (the bias voltage control process can be simpler), compared with the apparatus of the fourth aspect.

According to the sixth aspect, in the fifth aspect, when the bias voltage applier applies to the external optical modulator the bias voltage that can minimize an amount of second order distortion included in the optical signal outputted from the first port and caused by non-linearity of the external optical modulator, the bias voltage control circuit stores the minimized amount of second order distortion detected by the distortion detector as the reference value.

A seventh aspect is directed to, in an optical transmission apparatus comprising an external optical modulator that modulates an optical carrier from a light source with an electrical signal, a method of controlling a bias voltage applied to the external optical modulator. The method comprises measuring an amount of second order distortion included in an optical signal from the external optical modulator and caused by non-linearity thereof; and controlling the bias voltage applied to the external optical modulator so as to minimize the amount of second order distortion measured in the distortion measuring step.

According to an eighth aspect, in the seventh aspect, the bias voltage control method further comprises a step of detecting average optical power of the optical signal from the external optical modulator, wherein the bias voltage controlling step includes determining, based on the optical average power detected in the optical power detecting step, whether to increase or decrease the bias voltage applied to the external optical modulator.

According to a ninth aspect, in the seventh aspect, the external optical modulator includes: two waveguides for branching the optical carrier from the light source into two optical signals for guiding; an optical coupler for coupling the optical signals guided by the waveguides; and first and second ports provided to the optical coupler for outputting the two optical signals. Also, the bias voltage controlling step includes detecting an amount of second order distortion included in the optical signal from the second port and caused by non-linearity of the external optical modulator; and controlling the bias voltage applied to the external optical modulator so that the amount of second order distortion detected in the distortion detecting step agrees with a previously-stored reference value.

According to a tenth aspect, in the ninth aspect, the bias voltage control step includes storing the amount of second order distortion detected in the distortion detecting step as the reference value in an initial state in which the bias voltage is applied to the external optical modulator so as to minimize the amount of second order distortion included in an optical signal outputted from the first port and caused by non-linearity of the external optical modulator.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are described below with reference to the drawings.

(First Embodiment)

Figure 1:
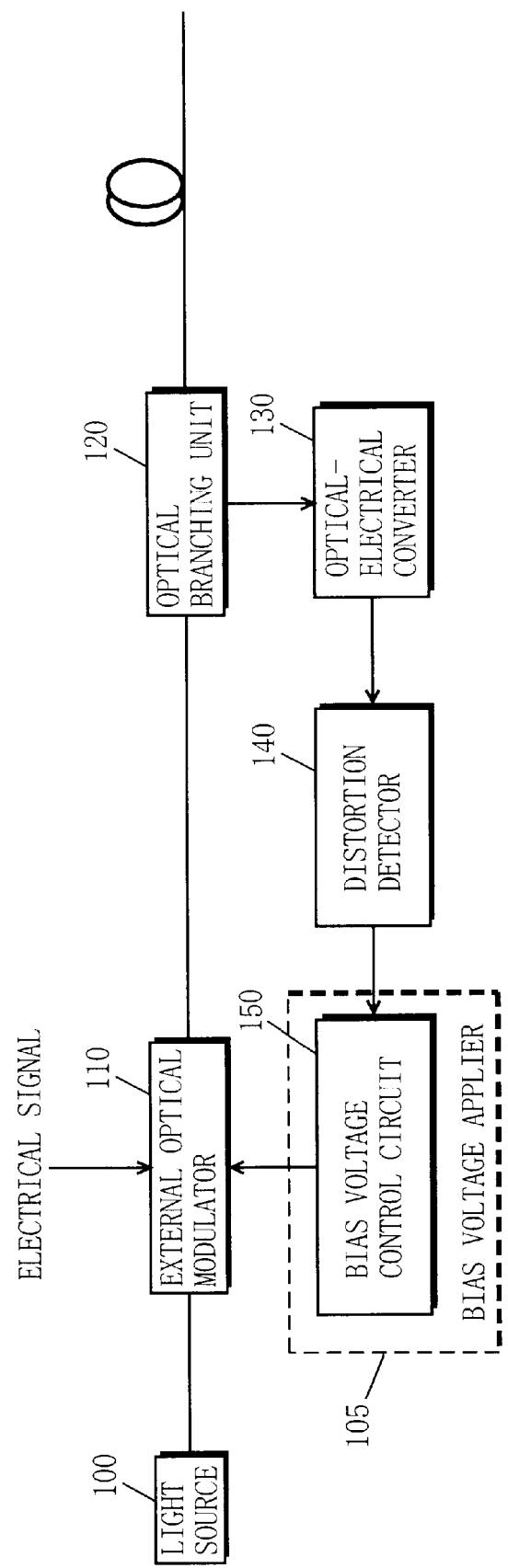
FIG. 1 is a block diagram showing the structure of an optical transmission apparatus according to a first embodiment of the present invention.

FIG. 1 is a block diagram showing the structure of an optical transmission apparatus according to a first embodiment of the present invention. In FIG. 1, the optical transmission apparatus includes a light source 100, a bias voltage applier 105, an external optical modulator 110, an optical branching unit 120, an optical-electrical converter 130, and a distortion detector 140. The bias voltage applier 105 includes a bias voltage control circuit 150.

The light source 100 outputs an optical carrier. The bias voltage applier 105 applies a bias voltage. The external optical modulator 110 is provided with the optical carrier outputted from the light source 100 and an electrical signal while receiving the bias voltage from the external optical modulator 110. The external optical modulator 110 then intensity-modulates the optical carrier with the biased electrical signal, and outputs an optical signal. Here, the electrical signal provided to the external optical modulator 110 is a signal into which a plurality of analog signals are multiplexed in frequency.

The optical branching unit 120 branches the optical signal outputted from the external optical modulator 110. One optical signal outputted from the optical branching unit 120 is transmitted through an optical transmission path to a receiver (not shown). The other optical signal outputted therefrom is provided to the optical-electrical converter 130, and converted therein into an electrical signal.

The electrical signal outputted from the optical-electrical converter 130 is provided to the distortion detector 140. The distortion detector 140 detects, based on the electrical signal, the amount of second order distortion included in the optical signal outputted from the external optical modulator 110 (hereinafter referred to as the amount of distortion). The amount of distortion detected by the distortion detector 140 is provided to the bias voltage control circuit 150. The bias voltage control circuit 150 controls the bias voltage applied by the bias voltage applier 105 to the external optical modulator 110 (hereinafter referred to as applied bias voltage) so as to minimize the amount of distortion.

The above distortion detector 140 is implemented by, for example, a filter for extracting only the components within a desired frequency band from the electrical signal and a circuit for measuring the level of the components (voltage). The distortion detector 140 typically extracts components within one band where second order distortion occurs. If the frequency of each analog signal included in the electrical signal is known, the frequency of potential second order distortion can be calculated in advance. Thus, a filter capable of extracting only the components in the vicinity of the calculated frequency is selected for use in the distortion detector 140.

Figure 2:
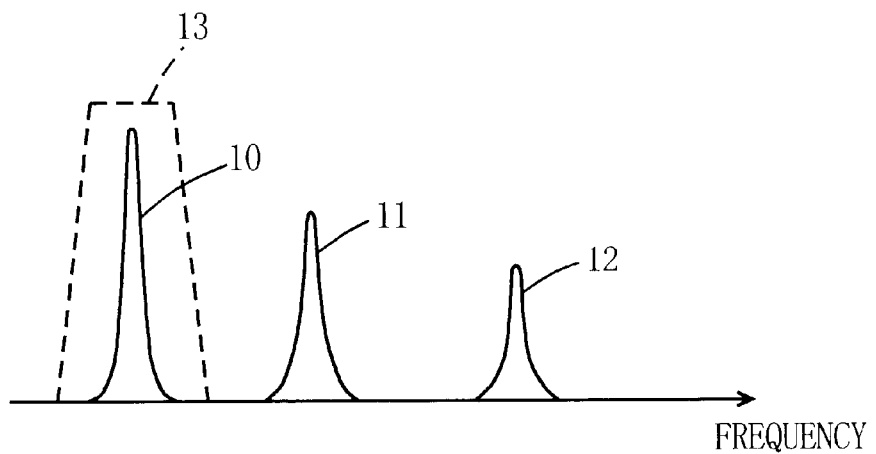
FIG. 2 is a diagram showing one example of second order distortion components included in an optical signal outputted from an external optical modulator 110 of FIG. 1 and a characteristic of a filter used in a distortion detector 140.

Note that, as shown in FIG. 2, if several second order distortions varied in frequency (10 to 12) occur, a filter having transmittance denoted by a reference numeral 13 is preferably used for extracting the highest second order distortion 10 in level. In this case, the peak level of the second order distortion 10 is outputted from the distortion detector 140 as the amount of distortion.

The operation of the above-structured optical transmission apparatus is now described below.

The optical carrier outputted from the light source 100 is inputted to the external optical modulator 110. In general, the light to the external optical modulator 110 is limited only to a TE mode or a TM mode by adjusting its plane of polarization. This adjustment can be made by various methods. In one method, a polarization controller is inserted between the light source 100 and the external optical modulator 110 for adjusting the plane of polarization. In another method, a polarization-maintaining fiber is used between the light source 100 and the external optical modulator 110. No such polarization controller nor polarization-maintaining fiber for adjusting the plane of polarization is shown in FIG. 1.

Supplied with the bias voltage by the bias voltage applier 105, the external optical modulator 110 intensity-modulates the input light with the input electrical signal, and then outputs an optical signal. The output optical signal is branched by the optical branching unit 120. One optical signal after branching is converted into an electrical signal by the optical-electrical converter 130. The electrical signal outputted from the optical-electrical converter 130 is provided to the distortion detector 140.

The distortion detector 140 has a function of extracting components within a desired band from AC components included in the electrical signal and measuring the level of the extracted components. Based on the measured level, the distortion detector 140 carries out a predetermined calculation, and thereby detects the amount of distortion included in the optical signal outputted from the external optical modulator 110. The desired band is not limited as long as it is where second order distortion occurs, but is preferably a band where a large amount of distortion occurs.

A signal outputted from the distortion detector 140 is provided to the bias voltage control circuit 150 in the bias voltage applier 105. The bias voltage control circuit 150 controls the applied bias voltage so as to minimize the amount of distortion detected by the distortion detector 140. With such structure, accuracy in controlling the bias voltage can be improved by using a relatively simple control method. Thus, the applied bias voltage can be maintained with a minimum amount of distortion (optimal bias voltage).

Here, a process of controlling the bias voltage carried out by the bias voltage control circuit 150 is described in detail. This process is similar to the conventional one for making the applied bias voltage follow a shift in the optimal bias voltage due to DC drift. The difference is, however, that the present process controls the applied bias voltage so as to minimize the amount of distortion included in the optical signal, while the conventional process does so by ensuring that the average power of the optical signal (that is, DC component) is constant.

Figure 3:
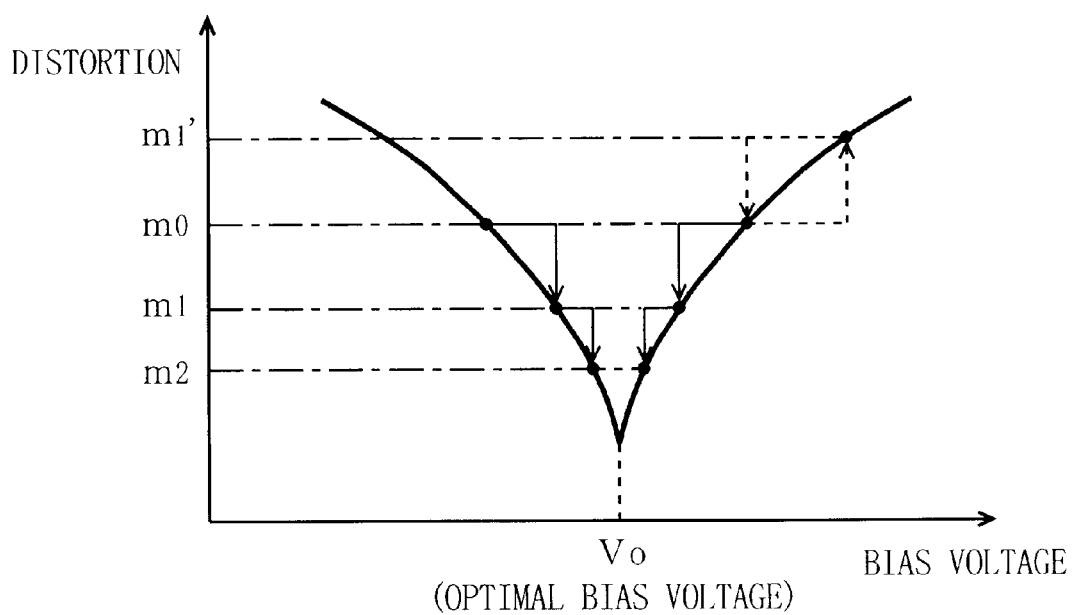
FIG. 3 is a diagram illustrating a process carried out by a bias voltage control circuit 150 of FIG. 1.
Figure 4:
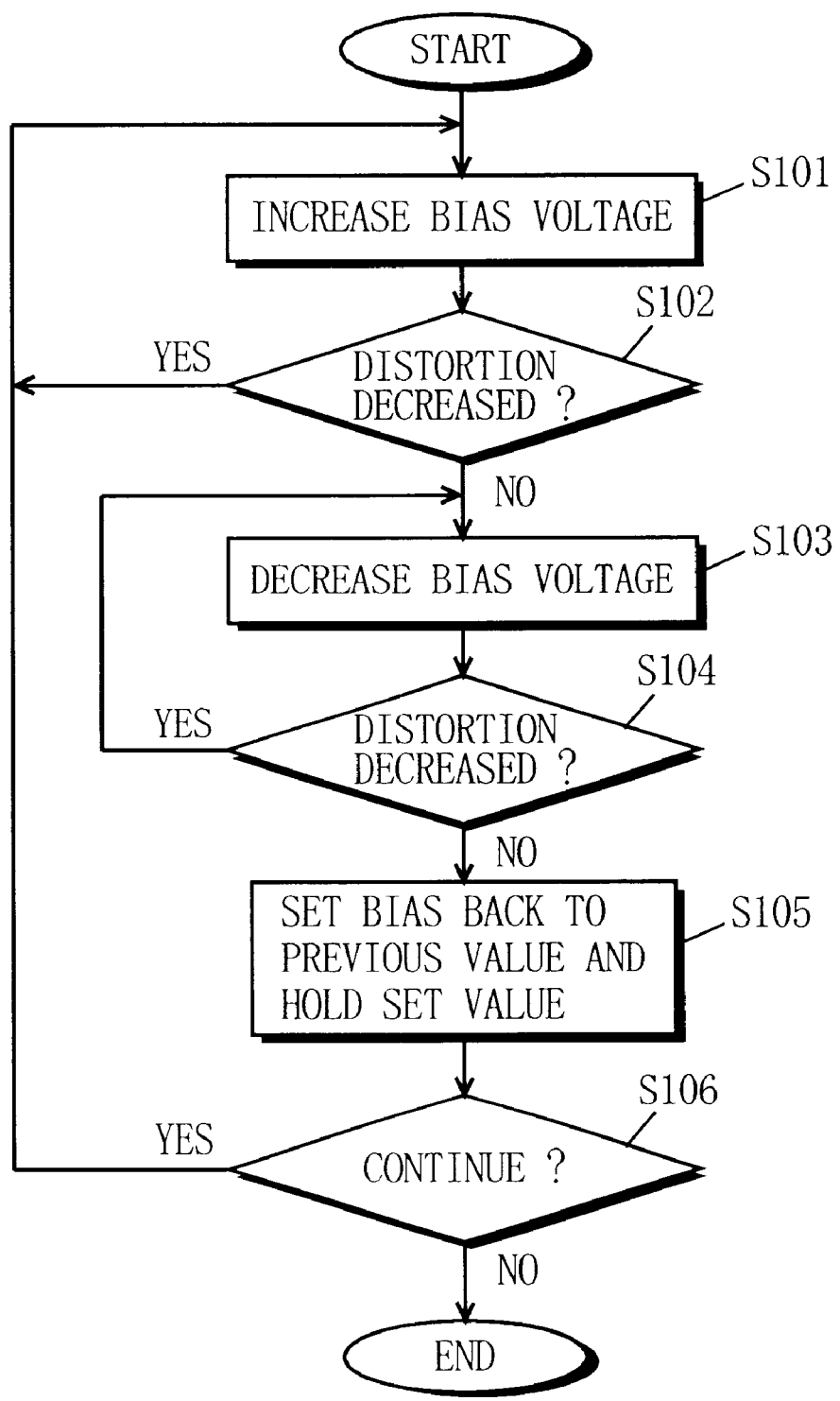
FIG. 4 is a flow chart showing a procedure carried out by the bias voltage control circuit 150 of FIG. 1.

FIG. 3 is a diagram illustrating the process carried out by the bias voltage control circuit 150 of FIG. 1. FIG. 4 is a flow chart showing a procedure carried out by the bias voltage control circuit 150 of FIG. 1. The relation between the bias voltage and the amount of distortion is similar to that shown in FIG. 14 (refer to Background Art section)

In FIGS. 3 and 4, the bias voltage control circuit 150 is provided with an amount of distortion m0 detected by the distortion detector 140. The bias voltage control circuit 150 first increases the applied bias voltage by a predetermined amount (step S101). Then, an amount of distortion after the increase in the applied bias voltage (m1) is provided by the distortion detector 140. The bias voltage control circuit 150 then compares the amounts of distortion before and after the increase in the applied bias voltage (m0 and m1) with each other to determine whether the amount of distortion has been decreased or not (step S102). If Yes, steps S101 and S102 are repeatedly carried out. That is, the bias voltage control circuit 150 again increases the applied bias voltage, and then compares an amount of distortion (m2) provided by the distortion detector 140 after the increase in the applied bias voltage with the amount of distortion before the increase (m1) to determine whether the amount of distortion has been decreased. If the amount of distortion has not been decreased, the procedure goes to step S103, and if decreased, the procedure goes to steps S101 and then S102 again.

If No in step S102 (that is, if the amount of distortion after the increase in step S101 in the applied bias voltage is not m1 but m1'), the bias voltage control circuit 150 decreases the applied bias voltage by a predetermined amount (step S103), and then determines whether the amount of distortion has been decreased (step S104). If Yes, steps S103 and S104 are repeatedly carried out. That is, the bias voltage control circuit 150 again decreases the applied bias voltage, and then compares the amount of distortion (m1) provided by the distortion detector 140 after the decrease in the applied bias voltage with the amount of distortion before the decrease (m0) to determine whether the amount of distortion has been decreased. If the amount of distortion has been decreased, the procedure goes to steps S103 and then S104 again.

If No in step S104, the bias voltage control circuit 150 sets the present value of the applied bias voltage back to the previous value, and holds the set value for a predetermined period (step S105). The period for holding the applied bias voltage is set to be shorter than a period during which variations in time and temperature may occur. Then, whether to continue the procedure is determined (step S106). If Yes, the procedure returns to step S101 for repeating the above process, and if No, the procedure ends.

With the above-described process carried out by the bias voltage control circuit 150, the bias voltage applied by the bias voltage applier 105 to the external optical modulator 110 can be made to follow a shift in the optimal bias voltage due to DC drift even if variations with time, temperature, or other factors occur.

In the above process, whether the amount of distortion has been decreased is determined before and after the bias voltage is increased (or decreased). Then, based on the determination result, whether to control the bias voltage to be increased or decreased is determined. Alternatively, another process may be carried out as follows.

In an initial state in which the applied bias voltage is equal to the optimal bias voltage, the amount of distortion provided by the distortion detector 140 is measured in advance, and stored in the bias voltage control circuit 150 as a reference value. Thereafter, the bias voltage control circuit 150 controls the applied bias voltage so that the amount of distortion provided by the distortion detector 140 becomes equal to the reference value. In other words, the bias voltage control circuit 150 compares the amount of distortion provided by the distortion detector 140 with the reference value, and increases (or decreases) the applied bias voltage if the amount of distortion becomes larger than the reference value.

(Second Embodiment)

Figure 5:
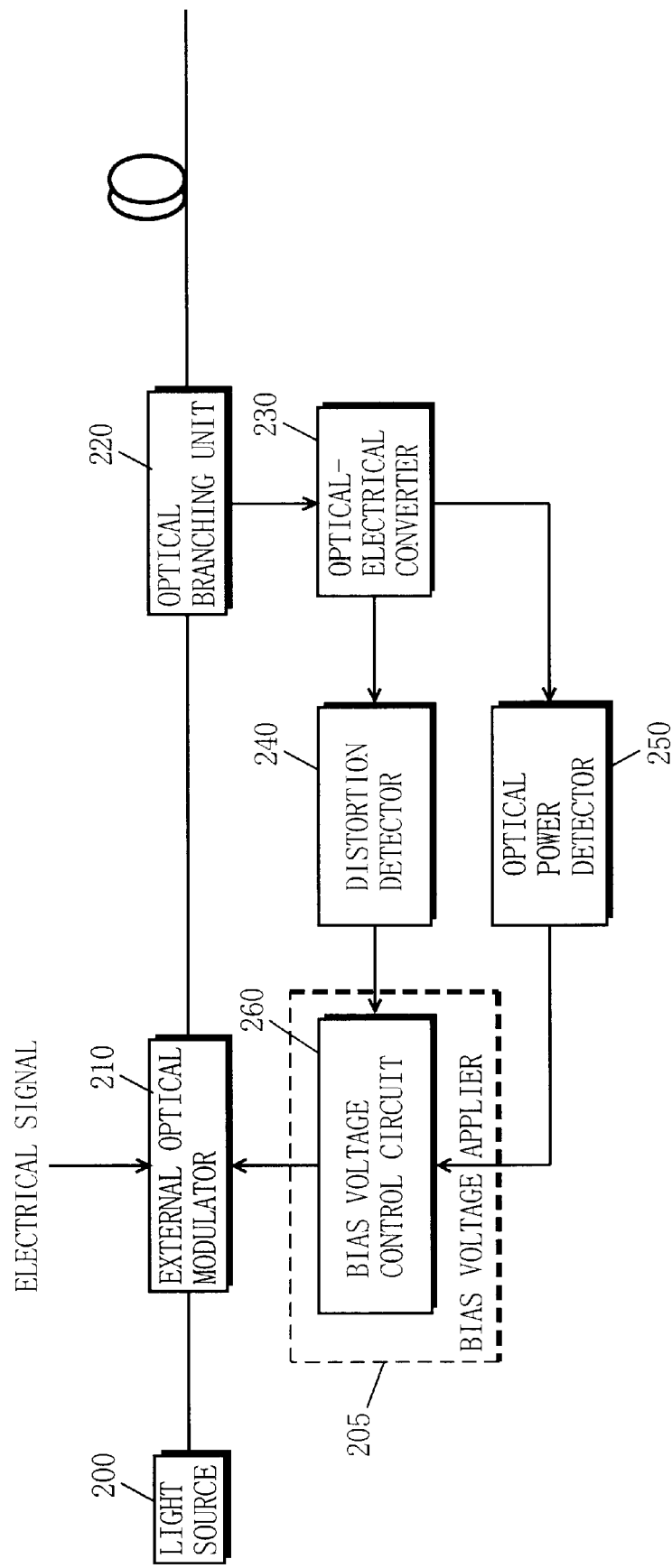
FIG. 5 is a block diagram showing the structure of an optical transmission apparatus according to a second embodiment of the present invention.

FIG. 5 is a block diagram showing the structure of an optical transmission apparatus according to a second embodiment of the present invention. In FIG. 5, the optical transmission apparatus includes a light source 200, a bias voltage applier 205, an external optical modulator 210, an optical branching unit 220, an optical-electrical converter 230, a distortion detector 240, and an optical power detector 250. The bias voltage applier 205 includes a bias voltage control circuit 260.

The light source 200, the bias voltage applier 205, the external optical modulator 210, the optical branching unit 220, the optical-electrical converter 230, and the distortion detector 240 are identical to those in FIG. 1, and therefore not described herein.

The electrical signal outputted from the optical-electrical converter 230 is provided to the optical power detector 250. The optical power detector 250 measures the electric power or current of the electrical signal, that is, DC components included in the electrical signal, for detecting average power of the optical signal outputted from the external optical modulator 210.

The amount of distortion detected by the distortion detector 240 is provided to the bias voltage control circuit 260. The bias voltage control circuit 260 controls the bias voltage applied by the bias voltage applier 205 to the external optical modulator 210 (applied bias voltage) so as to minimize the amount of distortion. At this control, the optical average power detected by the optical power detector 250 is provided to the bias voltage control circuit 260. The bias voltage control circuit 260 determines, based on the optical average power, whether to increase or decrease the applied bias voltage.

The operation of the above-structured optical transmission apparatus is now described below.

The optical carrier outputted from the light source 200 is inputted to the external optical modulator 210. As described in the first embodiment, the light provided to the external optical modulator 210 is generally adjusted in the plane of polarization so as to be limited to either a TE mode or TM mode. No polarization controller nor polarization-maintaining fiber for adjusting the plane of polarization is shown in FIG. 5.

Supplied with the bias voltage by the bias voltage applier 205, the external optical modulator 210 intensity-modulates the input light with the input electrical signal, and then outputs an optical signal. The output optical signal is branched by the optical branching unit 220. One optical signal after branching is converted into an electrical signal by the optical-electrical converter 230. The electrical signal outputted from the optical-electrical converter 230 including DC components and AC components is provided to the optical power detector 250 and the distortion detector 240. The optical power detector 250 has a function of measuring electric power or current (DC components) of the electrical signal outputted from the optical-electrical converter 230. Based on the measured electric power, the distortion detector 250 carries out a predetermined calculation, and thereby detects average power of the optical signal outputted from the external optical modulator 210.

On the other hand, the distortion detector 240 has a function of extracting components within a desired band from AC components included in the electrical signal and measuring the level of the extracted components. Based on the measured level, the distortion detector 240 carries out a predetermined calculation, and thereby detects the amount of distortion included in the optical signal outputted from the external optical modulator 210. The desired band is not limited as long as it is where second order distortion occurs, but is preferably a band where a large amount of distortion occurs.

Signals outputted from these detectors are provided to the bias voltage control circuit 260. The bias voltage control circuit 260 controls the applied bias voltage so as to minimize the amount of distortion included in the optical signal outputted from the external optical modulator 210, that is, so as to agree the applied bias voltage with a bias voltage that is optimal at this moment.

The bias voltage control circuit 260 compares the signal provided by the optical power detector 250 with a reference signal indicating optical average power at the initial state with the applied bias voltage being set to the optimal bias voltage. Then, based on the comparison result, the bias voltage control circuit 260 determines whether to increase or decrease the applied bias voltage.

Figure 12:
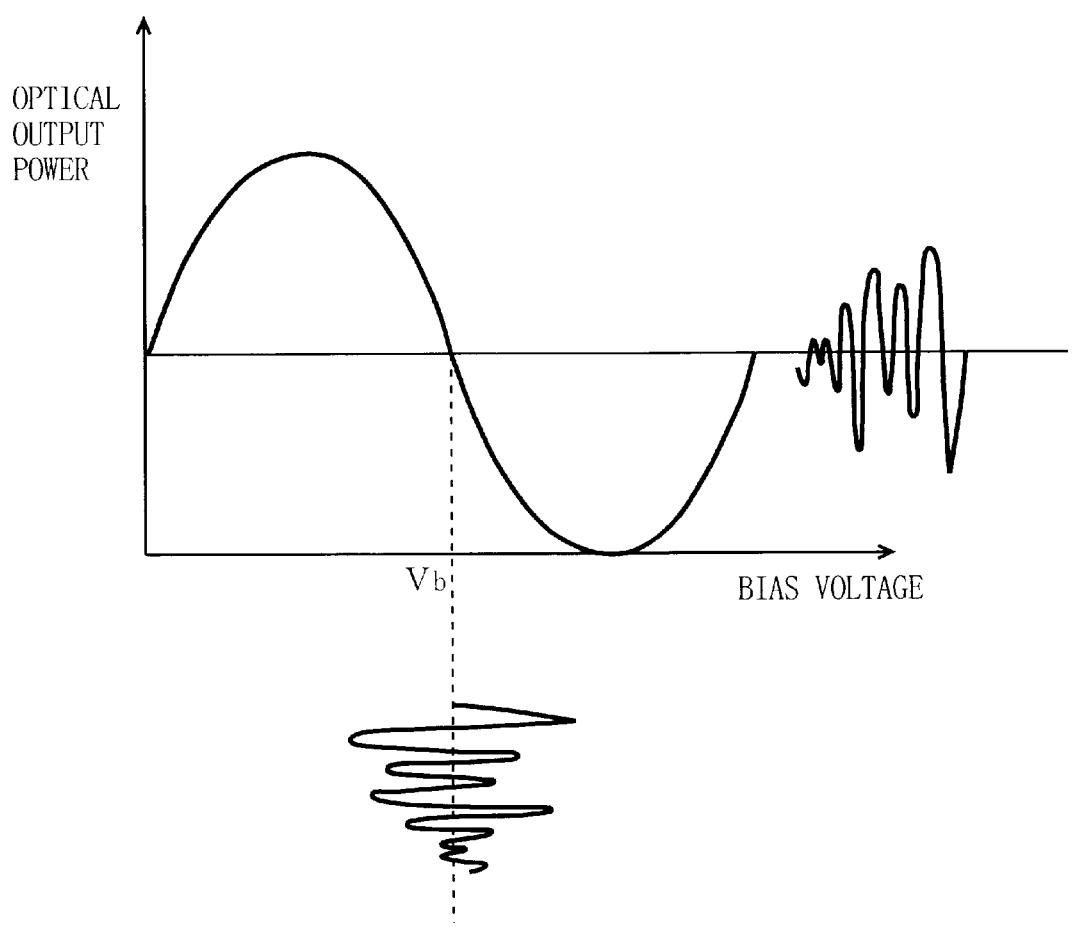
FIG. 12 is a diagram showing the relation between bias voltage applied to the external optical modulator of FIG. 11 and power of an optical signal outputted therefrom.
Figure 13:
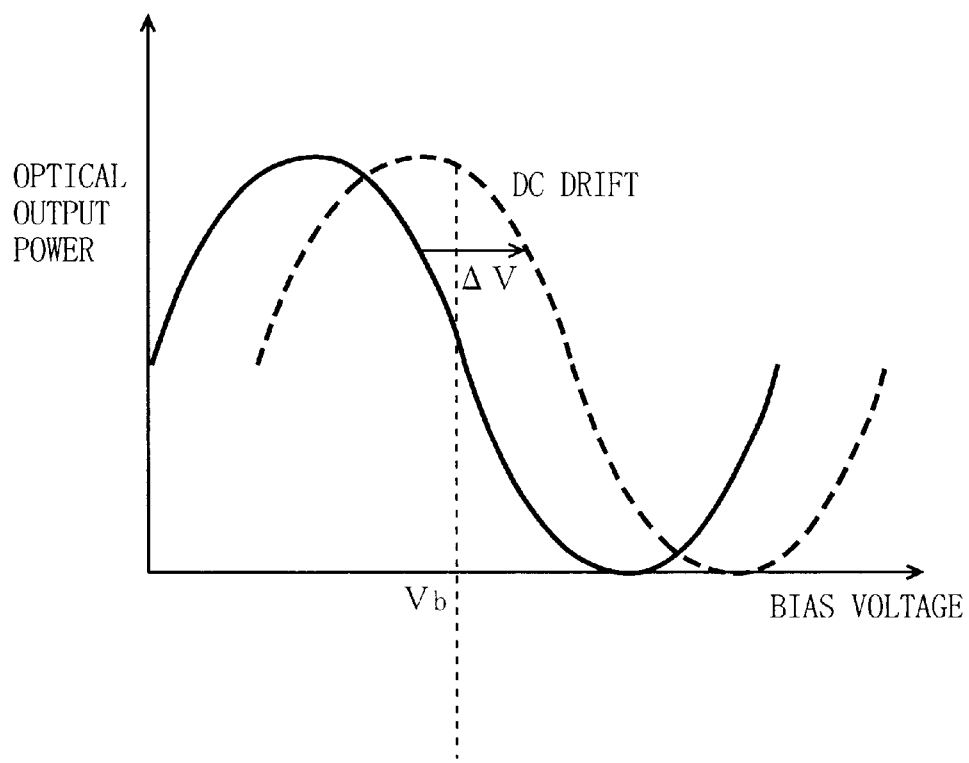
FIG. 13 is a diagram showing DC drift that occurs in the external optical modulator of FIG. 11.

Here, assume that a relation between the bias voltage applied to the external optical modulator 210 and the average power of the optical signal outputted therefrom shows such characteristic as illustrated in FIG. 12 (refer to Background Art section). If the signal provided by the optical power detector 250 is larger in level than the reference signal, the applied bias voltage is controlled to be increased. On the other hand, if smaller than the reference signal, the applied bias voltage is controlled to be decreased.

As such, the bias voltage control circuit 260 determines, based on the average power of the signal provided by the optical power detector 250, that is, the output light from the external optical modulator 210, whether to increase the applied bias voltage. Then, the bias voltage control circuit 260 finely adjusts the applied bias voltage so as to minimize the signal value provided by the distortion detector 240 (the amount of distortion included in the optical signal outputted from the external optical modulator 210).

Figure 14:
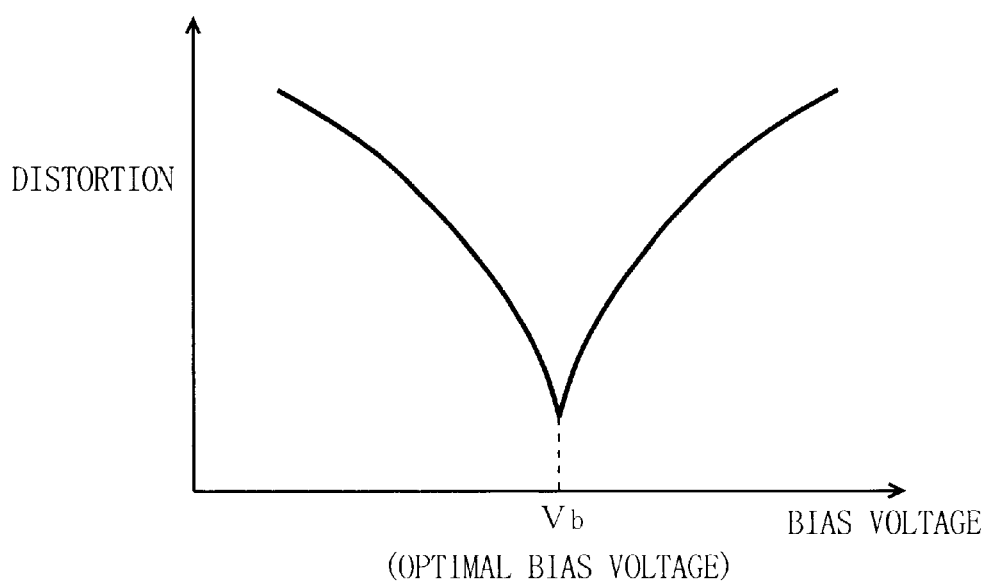
FIG. 14 is a diagram showing the relation between a bias voltage applied to the external optical modulator of FIG. 11 and the amount of second order distortion included in the optical signal outputted therefrom.
Figure 15:
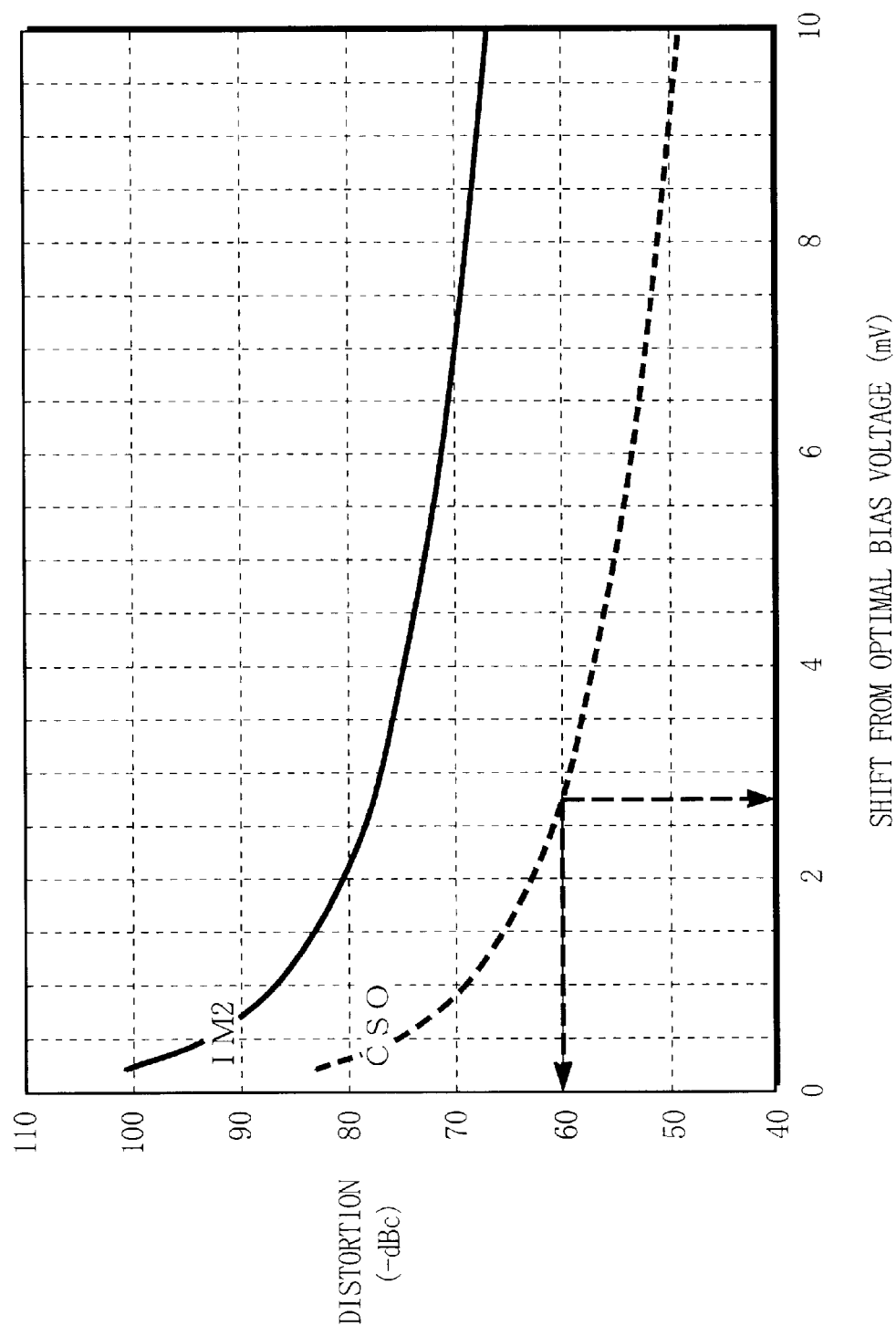
FIG. 15 is a diagram showing calculated second order distortion (IM2) and composite second order distortion (CSO) with respect to a shift in phase of the bias voltage applied to the external optical modulator of FIG. 11 from an optimal bias voltage.

In other words, as shown in FIG. 14 (refer to Background Art section), a symmetrical relation is observed between the bias voltage applied to the external optical modulator 210 and the amount of distortion included in the optical signal outputted therefrom with respect to the optimal bias voltage. Therefore, whether to increase or decrease the bias voltage cannot be promptly determined only by measuring the change in the amount of distortion. For this reason, such a complicated process as described in the first embodiment is generally required. However, with the above-structured optical transmission apparatus according to the second embodiment, control accuracy can be improved through a relatively simple process. Thus, the applied bias voltage can be maintained with a minimum amount of distortion (optimal bias voltage).

Here, a process of controlling the bias voltage carried out by the bias voltage control circuit 260 is described in detail. This process is similar to that in the first embodiment. That is, the bias voltage control circuit 260 controls the applied bias voltage so as to minimize the amount of distortion provided by the distortion detector 240, and thereby make the applied bias voltage follow a shift in the optimal bias voltage due to DC drift. The difference is that, in the second embodiment, whether to increase or decrease the applied bias voltage is determined prior to a start of bias voltage control based on the average power of the optical signal outputted from the external optical modulator 210. More specifically, if the relation shown in FIG. 12 is observed between the bias voltage applied to the external optical modulator 210 and the average power of the optical signal outputted therefrom, the present optical average power is compared with the reference value. If the present optical average power is larger than the reference value, the applied bias voltage is increased, and the applied bias voltage is decreased if the present optical average power is smaller than the reference value.

On the other hand, in the first embodiment, the applied bias voltage is increased once, and an increase or decrease in the amount of distortion caused thereby is detected. Then, based on the detection result, whether to increase or decrease the applied bias voltage is finally determined (refer to FIG. 3). If the amount of distortion has been decreased after the increase in the applied bias voltage, the applied bias voltage is further increased. If the amount of distortion is increased, however, the applied bias voltage had been changed away from the optimal bias voltage, and therefore should be decreased at this point. (shown by dotted arrows in FIG. 3). Thus, it may take much time to follow.

Figure 6:
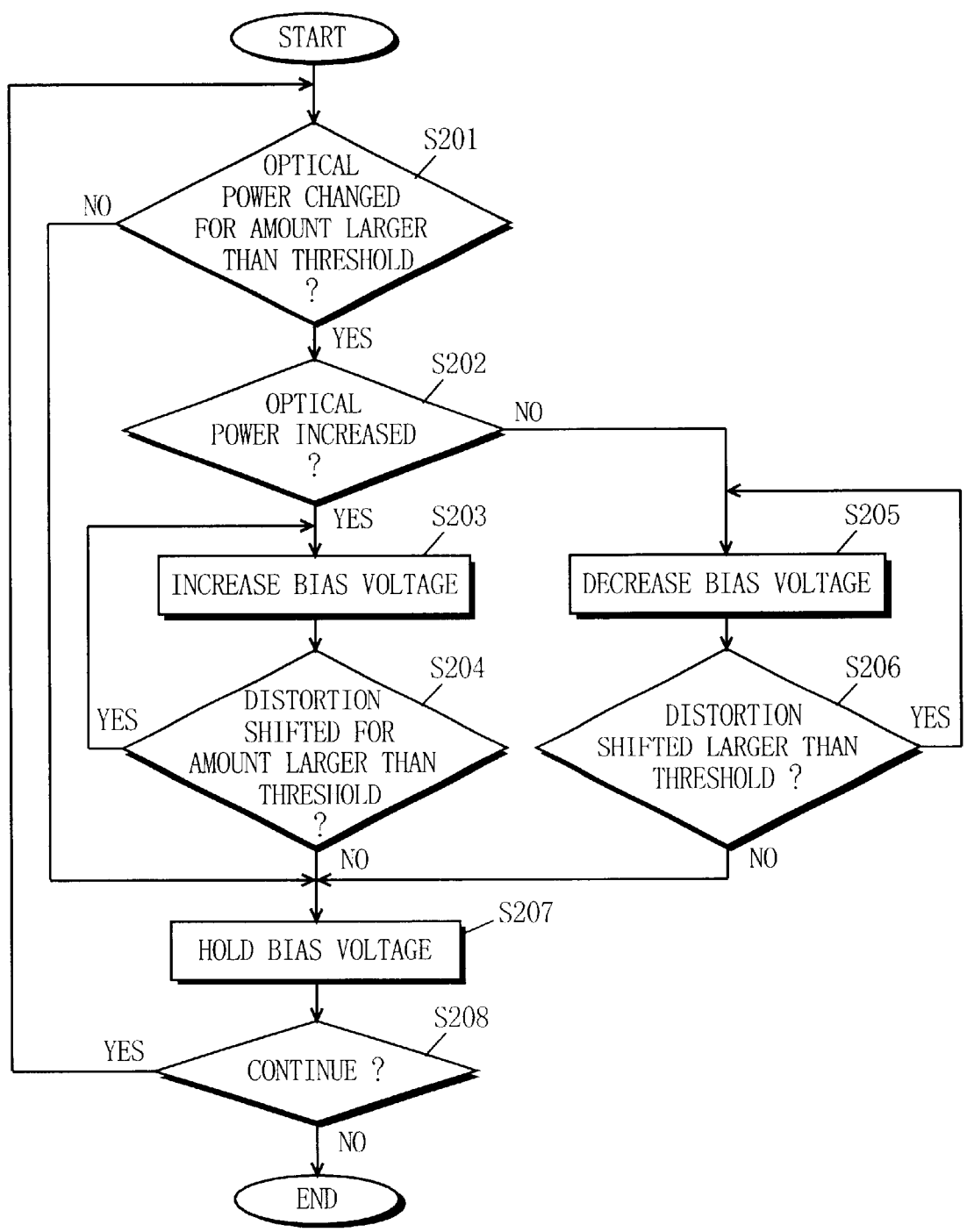
FIG. 6 is a flow chart showing a procedure carried out by a bias voltage control circuit 260 of FIG. 5.

FIG. 6 is a flow chart showing a procedure carried out by the bias voltage control circuit 260 of FIG. 5.

Note that the process carried out by the bias voltage control circuit 150 of FIG. 1 is illustrated in FIG. 3 (refer to FIG. 1). For the process carried out by the bias voltage control circuit 260 shown in FIG. 5, a part shown by the dotted arrows is not required in the control process shown by arrows in FIG. 3. That is, in the first embodiment, the applied bias voltage is increased once. If, as a result, the amount of distortion is increased, the applied bias voltage is decreased at this point. Such a waste of processing is not required in the second embodiment.

In FIG. 6, the bias voltage control circuit 260 is provided with the amount of distortion m0 detected by the distortion detector 240 and the optical average power detected by the optical power detector 250. The bias voltage control circuit 260 first compares the provided optical average power with the reference value to determine whether the optical average power has been changed by an amount larger than a predetermined threshold (step S201). If No, the procedure goes to step S207.

If Yes in step S201, the bias voltage control circuit 260 determines whether the optical average power has been increased (step S202). If Yes, the bias voltage control circuit 260 increases the applied bias voltage by a predetermined amount (step S203). Then, an amount of distortion after the increase in the applied bias voltage (m1) is provided by the distortion detector 240. The bias voltage control circuit 260 then compares the amounts of distortion before and after the increase in the applied bias voltage (m0 and m1) with each other to determine whether the amount of distortion has been shifted by an amount larger than the predetermined threshold (step S204). If No, the procedure goes to step S207.

If Yes, steps S203 and S204 are repeatedly carried out. That is, the bias voltage control circuit 260 again increases the applied bias voltage, and then compares an amount of distortion (m2) provided by the distortion detector 240 after the increase in the applied bias voltage with the amount of distortion before the increase (m1) to determine whether the amount of distortion has been changed by an amount larger than the threshold. If No, the procedure goes to step S207, and if Yes, the procedure goes to steps S203 and then S204 again.

If No in step S202, the bias voltage control circuit 260 decreases the applied bias voltage by a predetermined amount (step S205). Then, the amount of distortion after the decrease in the applied bias voltage (m1) is provided. The bias voltage control circuit 260 then compares the amounts of distortion before and after the decrease in the applied bias voltage (m0 and m1) with each other to determine whether the amount of distortion has been shifted by an amount larger than the predetermined threshold (step S206). If No, the procedure goes to step S207.

If Yes in step S206, steps S205 and S206 are repeatedly carried out. That is, the bias voltage control circuit 260 again decreases the applied bias voltage, and then compares an amount of distortion (m2) provided by the distortion detector 240 after the decrease in the applied bias voltage with the amount of distortion before the decrease (m1) to determine whether the amount of distortion has been changed by an amount larger than the threshold (step S204). If No, the procedure goes to step S207. If Yes, the procedure returns to steps S205 and then S206.

In step S207, the bias voltage control circuit 260 holds the present value of the applied bias voltage for a predetermined period. The period for holding the applied bias voltage is set to be shorter than a period during which variations in time and temperature may occur. Then, whether to continue the procedure is determined (step S208). If Yes, the procedure returns to step S201 for repeating the above process, and if No, the procedure ends.

With the above-described process carried out by the bias voltage control circuit 260, the bias voltage applied by the bias voltage applier 205 to the external optical modulator 210 can be made to follow a shift in the optimal bias voltage due to DC drift. Also, if the optimal bias voltage is shifted, such following can be started more quickly compared with the first embodiment.

(Third Embodiment)

Figure 7:
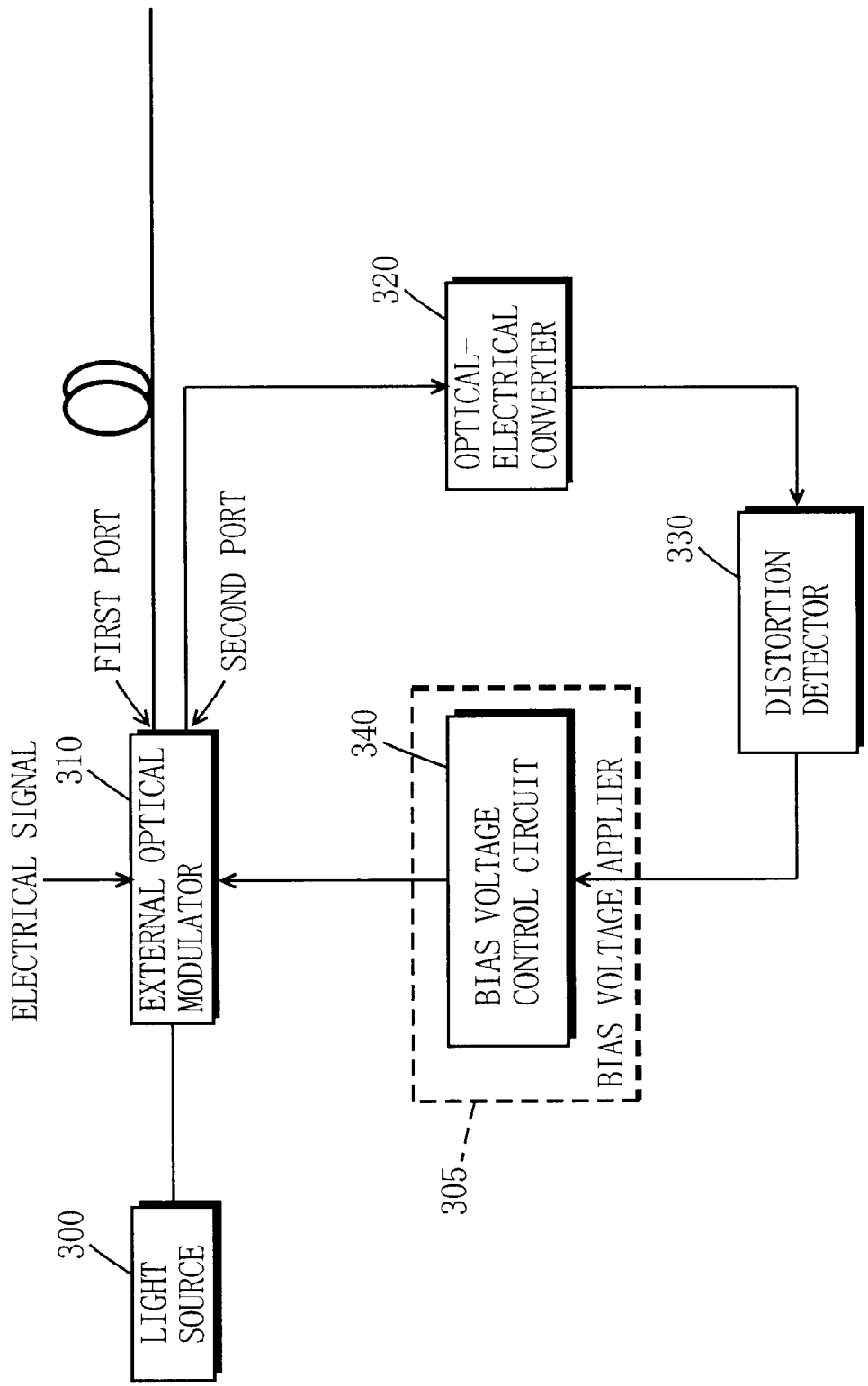
FIG. 7 is a block diagram showing the structure of an optical transmission apparatus according to a third embodiment of the present invention.

FIG. 7 is a block diagram showing the structure of an optical transmission apparatus according to a third embodiment of the present invention. In FIG. 7, the optical transmission apparatus includes a light source 300, a bias voltage applier 305, an external optical modulator 310, an optical-electrical converter 320, and a distortion detector 330. The bias voltage applier 305 includes a bias voltage control circuit 340.

The light source 300, the bias voltage applier 305, the optical-electrical converter 320, and the distortion detector 330 are identical to those in FIG. 1, and therefore not described herein.

As the external optical modulator 110 of FIG. 1, the external optical modulator 310 is provided with an optical carrier outputted from the light source 300 and an electrical signal while being supplied with a bias voltage by the bias voltage applier 305. The external optical modulator 310 then intensity-modulates the optical carrier with the electrical signal, and outputs optical signals. Here, the electrical signal provided to the external optical modulator 310 is a signal into which a plurality of analog signals are multiplexed in frequency. The external optical modulator 310 is different from the external optical modulator 110 of FIG. 1 in that two output ports, first and second, are provided. One optical signal is outputted from the first port through an optical transmission path to a receiver (not shown). The other optical signal is outputted from the second port to the optical-electrical converter 320, and converted into an electrical signal therein.

Figure 8:
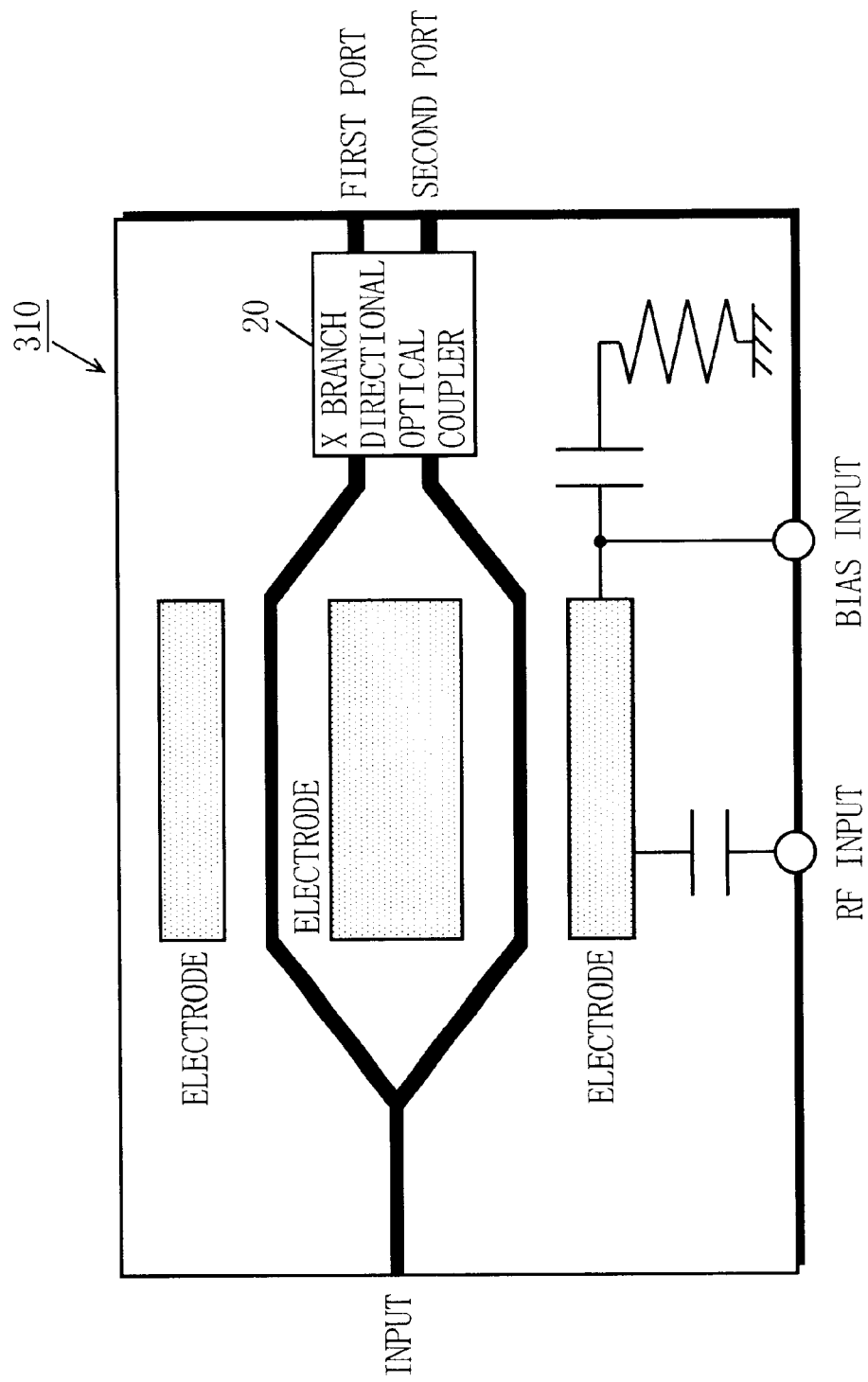
FIG. 8 is a diagram showing the structure of an external optical modulator of FIG. 7.
Figure 11:
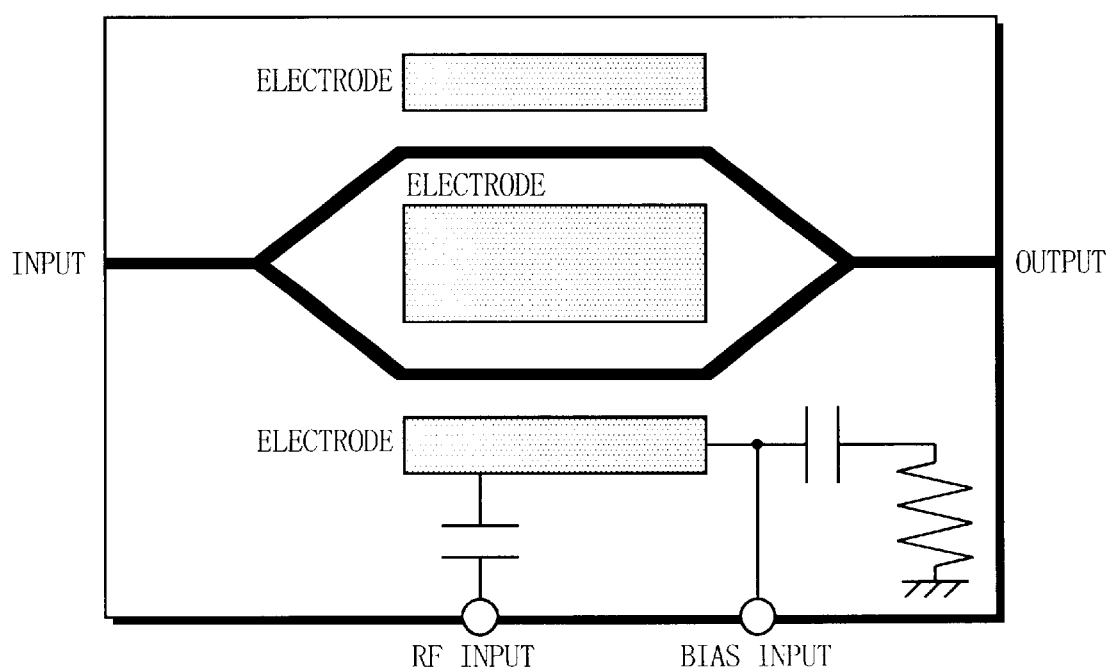
FIG. 11 is a diagram showing the structure of a conventional Mach-Zehnder-type external optical modulator.

FIG. 8 is a diagram showing the structure of the external optical modulator 310 of FIG. 7. Shown in FIG. 8 is such external optical modulator as further including an X branching directivity optical coupler 20 in the external optical modulator of FIG. 11 (refer to Background Art section). In FIG. 8, optical signals from two waveguides are provided to the X branching directivity optical coupler 20, coupled to each other therein, and then outputted through the first and second ports. At this time, in general, the optical signals outputted from the first and second ports are shifted in relation between the bias voltage and the amount of distortion.

Figure 9:
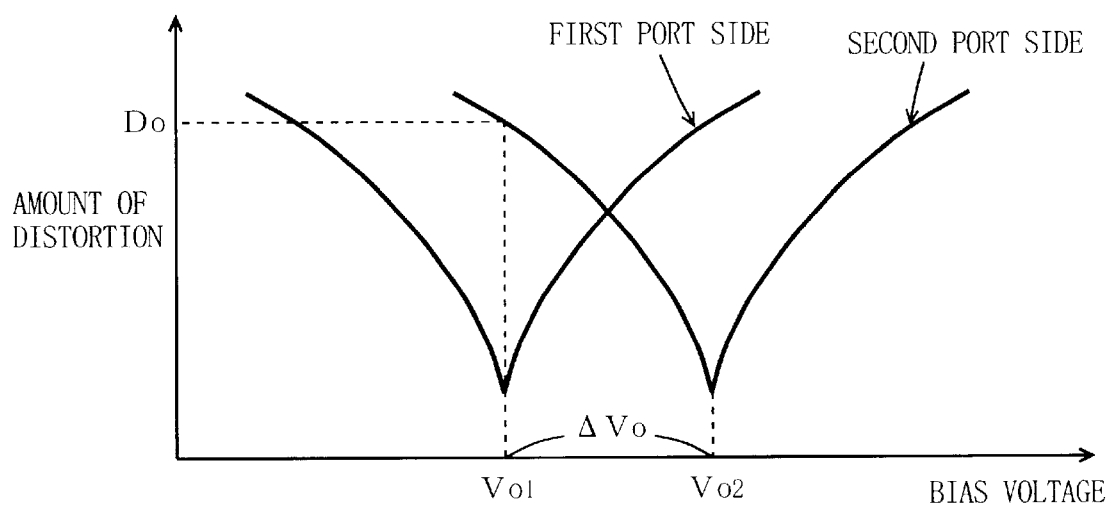
FIG. 9 is a diagram showing the relation between a bias voltage and the amount of distortion at an initial state regarding optical signals outputted from first and second ports.

FIG. 9 is a diagram showing the relation between the bias voltage and the amount of distortion at an initial state regarding optical signals outputted from the first and second ports of the external optical modulator 310 of FIG. 7. As shown in FIG. 9, at the initial state, the optical signals outputted from the first and second ports differ in optimal bias voltage (Vo1 and Vo2, respectively, where Vo1<Vo2) for a predetermined voltage (=ΔVo).

Thereafter, these optimal bias voltages Vo1 and Vo2 are shifted due to DC drift such as variations with time and temperature. At this time, the difference between these voltages (=Vo2−Vo1) is kept at a constant voltage (=ΔVo) as in the initial state.

However, even if the bias voltage is controlled so that the amount of distortion included in the optical signal from the second port becomes minimum, the amount of distortion included in the optical signal from the first port to the receiver does not become minimum.

In a state where the applied bias voltage is equal to the optimal bias voltage (=Vo1) in the first port side (that is, the initial state shown in FIG. 9), assume that the amount of distortion included in the optical signal from the second port is D0. For making the applied bias voltage follow the shift in the optimal bias voltage Vo1 in the first port side, the bias voltage is controlled by monitoring the amount of distortion included in the optical signal from the second port for keeping it at D0. This is because these two optimal bias voltages Vo1 and Vo2 are shifted with the difference therebetween (=Vo2−Vo1) being kept constant (=ΔVo) and, therefore, if the amount of distortion included in the optical signal from the second port is kept at D0, the amount of distortion included in the optical signal from the first port can be kept at minimum.

Thus, the bias voltage control circuit 340 controls the bias voltage applied by the bias voltage applier 305 to the external optical modulator 310 so that the amount of distortion provided by the distortion detector 330 (that is, the amount of distortion included in the optical signal from the second port of the external optical modulator 310) becomes D0. More specifically, the bias voltage control circuit 340 compares the amount of distortion provided by the distortion detector 330 with DO. If the amount is larger than D0, the bias voltage control circuit 340 increases the applied bias voltage, and if smaller, decreases the same.

The operation of the above-structure optical transmission apparatus is now described below.

The external optical modulator 310 has two output ports, first and second. Ideally, optical signals outputted from these first and second ports are identical in characteristic, but in reality, they are generally different in characteristic due to various factors For example, as shown in FIG. 9, there occurs a shift in bias-distortion characteristic between the ports. Therefore, each bias voltage for minimizing the amount of distortion included in the optical signals from each ports takes a different value, that is, Vo1 for the first port and Vo2 for the second port. In the present embodiment, by utilizing the difference in bias-distortion characteristic between the ports, whether to increase or decrease the bias voltage is determined.

More specifically, the optical signal from the first port is transmitted to the receiver side, while the optical signal from the second port is used for controlling the bias voltage. The bias voltage for minimizing the amount of distortion included in the optical signal from the first port (the optimal bias voltage in the first port side) agrees with the bias voltage for keeping the amount of distortion included in the optical signal from the second port at D0. Also, the optimal bias voltage in the first port side is within a region in which the amount of distortion monotonously increases as the bias voltage increases. For these reasons, the amount of distortion included in the optical signal from the second port is detected and compared with D0, and thereby whether to increase or decrease the bias voltage can be instantaneously determined. Thus, only by monitoring the amount of distortion, the bias voltage can be quickly adjusted.

Here, the operation of the present optical transmission apparatus is described in a case where the optical signal from the first port is transmitted to the receiver side, while the optical signal from the second port is used for controlling the bias voltage.

The optical carrier outputted from the light source 300 is inputted to the external optical modulator 310. As described in the first embodiment, the light provided to the external optical modulator 310 is generally adjusted in the plane of polarization so as to be limited to either a TE mode or TM mode. No polarization controller nor polarization-maintaining fiber for adjusting the plane of polarization is shown in FIG. 9.

Supplied with the bias voltage by the bias voltage applier 305, the external optical modulator 310 intensity-modulates the input light with the input electrical signal, and then outputs optical signals from the first and second ports. The output optical signal from the first port is transmitted through an optical transmission path to the receiver side.

The optical signal from the second port is converted by the optical-electrical converter 320 into an electrical signal. The electrical signal outputted from the optical-electrical converter 320 is provided to the distortion detector 330. The distortion detector 330 has a function of extracting components within a desired band from AC components included in the electrical signal and measuring the level of the extracted components. Based on the measured level, the distortion detector 140 carries out a predetermined calculation, and thereby detects the amount of distortion included in the optical signal outputted from the external optical modulator 310. The desired band is not limited as long as it is where second order distortion occurs, but is preferably a band where a large amount of distortion occurs.

A signal outputted from the distortion detector 330 indicates the amount of distortion included in the optical signal from the second port side, and is provided to the bias voltage control circuit 340 in the bias voltage applier 305. The bias voltage control circuit 340 controls the bias voltage applied by the bias voltage applier 305 to the external optical modulator 310 (applied bias voltage) so that the amount of distortion included in the optical signal from the second port side becomes D0.

More specifically, as shown in FIG. 9, even if the applied bias voltage is controlled so that the amount of distortion included in the optical signal from the second port becomes minimum, the amount of distortion included in the optical signal from the first port to the receiver does not become minimum. Therefore, in the initial state of applying a bias voltage from making the amount of distortion included in the optical signal from the first port at minimum, the amount of distortion D0 included in the optical signal from the second port is measured in advance, and stored in the bias voltage control circuit 340. Then, the bias voltage control circuit 340 controls the applied bias voltage so that the amount of distortion included in the optical signal from the second port becomes equal to the stored amount of distortion D0. With such structure, control accuracy can be improved by a relatively simple process. Thus, the applied bias voltage can be maintained with a minimum amount of distortion included in the optical signal transmitted to the receiver (optimal bias voltage).

Here, the above-stated process of controlling the bias voltage is described in detail. This process is carried out by controlling the applied bias voltage so that the amount of distortion provided by the distortion detector 330 (that is, the amount of distortion included in the optical signal from the second port) becomes D0 (D0 is the amount of distortion provided by the distortion detector 330 in the initial state where the applied bias voltage is equal to the optimal bias voltage Vo1 in the first port side). With this process, the applied bias voltage can be made to follow a shift in the optimal bias voltage Vo2 in the first port side.

This control allows quick determination whether to increase or decrease the applied bias voltage based on whether the amount of distortion provided by the distortion detector 330 is larger or smaller that D0. In other words, the bias voltage control circuit 340 compares the amount of distortion provided by the distortion detector 330 with D0. If the amount of distortion is larger than D0, the bias voltage control circuit 340 increases the applied bias voltage, and if smaller, decreases the applied bias voltage.

On the other hand, in the first embodiment, the applied bias voltage is increased once, and in increase or decrease in the amount of distortion caused thereby is detected. Then, based on the detection result, whether to increase or decrease the applied bias voltage is finally determined. Therefore, the applied bias voltage may be changed away from the optimal bias voltage, and it may take some time to follow.

Figure 10:
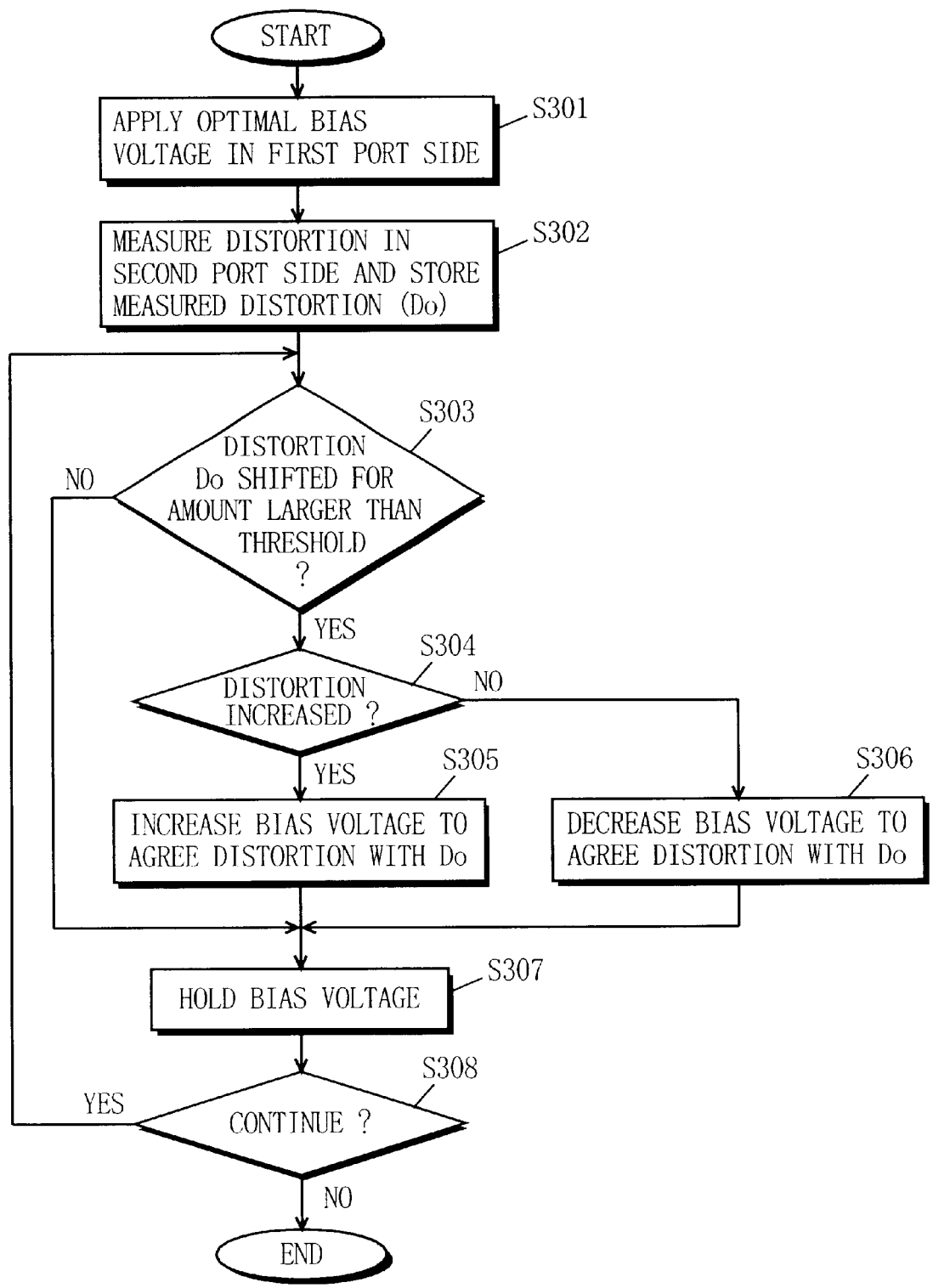
FIG. 10 is a flow chart showing a procedure carried out by a bias voltage control circuit 340 of FIG. 7.

FIG. 10 is a flow chart showing the procedure carried out by the bias voltage control circuit 340 of FIG. 7. In FIG. 10, the bias voltage control circuit 340 first applies a bias voltage equal to the optimal bias voltage Vo1 in the first port side to the external optical modulator 310 through the bias voltage applier 305 (step S301). The bias voltage control circuit 340 then stores the amount of distortion D0 provided by the distortion detector 330 (step S302).

Thereafter, the bias voltage control circuit 340 is provided with the amount of distortion detected by the distortion detector 330. The bias voltage control circuit 340 compares the provided amount of distortion with the amount of distortion D0 stored in step S302 to determine whether the amount of distortion has been shifted by an amount larger than a predetermined threshold (step S303). If No, the procedure then goes to step S307.

If Yes in step S303, the bias voltage control circuit 340 determines whether the amount of distortion has been increased (step S304). If Yes, the bias voltage control circuit 340 increases the applied bias voltage so that the amount of distortion agrees with D0 while monitoring the amount of distortion provided by the distortion detector 330 (step S305). The procedure then goes to step S307.

If No in step S304, the bias voltage control circuit 340 decreases the applied bias voltage so that the amount of distortion agrees with D0 while monitoring the amount of distortion provided by the distortion detector 330 (step S306). The procedure then goes to step S307.

In step S307, the bias voltage control circuit 340 holds the present value of the applied bias voltage for a predetermined period. The period for holding the applied bias voltage is set to be shorter than a period during which variations in time and temperature may occur. Then, whether to continue the procedure is determined (step S308). If Yes, the procedure returns to step S303 for repeating the above process, and if No, the procedure ends.

With the above-described process carried out by the bias voltage control circuit 340, the bias voltage applied by the bias voltage applier 305 to the external optical modulator 310 can be made to follow a shift in the optimal bias voltage in the first port side due to variations with time or temperature. Also, if the optimal bias voltage is shifted, such following can be started more quickly compared with the first embodiment.

This quick start to follow can be achieved by the second embodiment. However, in the third embodiment, the bias voltage is controlled so that the amount of distortion provided by the distortion detector 330 agrees with D0 (constant), and thus only the amount of distortion is needed to be monitored. For this reason, compared with the second embodiment in which the amount of distortion and the optical average power are to be monitored, the apparatus can be made simpler in structure, and the control process can be simpler.

While the invention has been described in detail, the foregoing description is in all aspects illustrative and not restrictive. It is understood that numerous other modifications and variations can be devised without departing from the scope of the invention.

What is claimed is:

1. An optical transmission apparatus comprising:

a light source operable to output an optical carrier;

an external optical modulator operable to modulate the optical carrier outputted from said light source with an electrical signal;

a bias voltage applier operable to apply a bias voltage to said external optical modulator; and a bias voltage controller operable to control the bias voltage applied by said bias voltage applier to said external optical modulator based on an amount of second order distortion included in an optical signal from said external optical modulator and caused by non-linearity of said external optical modulator, said bias voltage controller comprising:

an optical branching unit operable to branch the optical signal from said external optical modulator into two optical signals;

an optical-electrical converter operable to convert one of the two optical signals from said optical branching unit into an electrical signal;

a distortion detector operable to detect the amount of second order distortion included in the optical signal from said external optical modulator and caused by the non-linearity of said external optical modulator by extracting a component in a specific band from the electrical signal provided by said optical-electrical converter and measuring a level of the component; and a bias voltage control circuit operable to control the bias voltage applied by said bias voltage applier to said external optical modulator so as to minimize the amount of second order distortion detected by said distortion detector, said bias voltage control circuit increasing or decreasing the bias voltage applied by said bias voltage applier to said external optical modulator, determining whether the second order distortion detected by said distortion detector is increased or decreased before and after increasing or decreasing said bias voltage, and determining, based on a determination result, whether to increase or decrease the bias voltage at a next time.

2. An optical transmission apparatus comprising:

a light source operable to output an optical carrier;

an external optical modulator operable to modulate the optical carrier outputted from said light source with an electrical signal;

a bias voltage applier operable to apply a bias voltage to said external optical modulator; and a bias voltage controller operable to control the bias voltage applied by said bias voltage applier to said external optical modulator based on an amount of second order distortion included in an optical signal from said external optical modulator and caused by non-linearity of said external optical modulator, said bias voltage controller comprising:

an optical branching unit operable to branch the optical signal from said external optical modulator into two optical signals;

an optical-electrical converter operable to convert one of the two optical signals from said optical branching unit into an electrical signal;

a distortion detector operable to detect the amount of second order distortion included in the optical signal from said external optical modulator and caused by the non-linearity of said external optical modulator by extracting a component in a specific band from the electrical signal provided by said optical-electrical converter and measuring a level of the component;

an optical power detector operable to detect an average optical power of the one of the two optical signals from said external optical modulator by measuring an electrical power of the electrical signal from said optical-electrical converter; and a bias voltage control circuit operable to control the bias voltage applied by said bias voltage applier to said external optical modulator so as to minimize the amount of second order distortion detected by said distortion detector, wherein said bias voltage control circuit determines, based on the average optical power detected by said optical power detector, whether to increase or decrease the bias voltage applied by said bias voltage applier to said external optical modulator.

3. An optical transmission apparatus comprising:

a light source operable to output an optical carrier;

an external optical modulator operable to modulate the optical carrier outputted from said light source with an electrical signal, said external optical modulator comprising two waveguides adapted to branch and guide the optical carrier from said light source into two optical signals, an optical coupler adapted to couple the two optical signals guided by said two waveguides, and first and second ports adapted to output the two optical signals, respectively, from said optical coupler;

a bias voltage applier operable to apply a bias voltage to said external optical modulator; and a bias voltage controller operable to control the bias voltage applied by said bias voltage applier to said external optical modulator based on an amount of second order distortion included in an optical signal from said external optical modulator and caused by non-linearity of said external optical modulator, said bias voltage controller comprising an optical-electrical converter operable to convert the optical signal from said second port into an electrical signal, a distortion detector operable to detect the amount of second order distortion included in the optical signal from said second port and caused by non-linearity of said external optical modulator by extracting a component in a specific band from the electrical signal outputted from said optical-electrical converter and measuring a level of the component, and a bias voltage control circuit operable to control the bias voltage applied by said bias voltage applier to said external optical modulator so that the amount of second order distortion detected by said distortion detector agrees with a previously-stored reference value, wherein when said bias voltage applier applies to said external optical modulator, the bias voltage that can minimize an amount of second order distortion included in the optical signal outputted from said first port and caused by non-linearity of said external optical modulator, said bias voltage control circuit stores the minimized amount of second order distortion detected by said distortion detector as the reference value.

4. A method of controlling a bias voltage applied to an external optical modulator in an optical transmission apparatus, the external optical modulator being operable to modulate an optical carrier from a light source with an electrical signal, said method comprising:

measuring an amount of second order distortion included in an optical signal from the external optical modulator and caused by non-linearity of the external optical modulator;

detecting an average optical power of the optical signal from the external optical modulator; and controlling the bias voltage applied to the external optical modulator so as to minimize the amount of second order distortion measured in said measuring of the amount of second order distortion operation, said controlling of the bias voltage operation comprising determining, based on the average optical power detected in said detecting of the average optical power operation, whether to increase or decrease the bias voltage applied to the external optical modulator.

5. A method of controlling a bias voltage applied to an external optical modulator in an optical transmission apparatus, the external optical modulator being operable to modulate an optical carrier from a light source with an electrical signal, and the external optical modulator comprising two waveguides adapted to branch and guide the optical carrier from the light source into two optical signals, an optical coupler adapted to couple the two optical signals guided by the two waveguides, and first and second ports provided to the optical coupler, the first and second ports being adapted to output the two optical signals, respectively, said method comprising:

measuring an amount of second order distortion included in an optical signal from the external optical modulator and caused by non-linearity of the external optical modulator; and controlling the bias voltage applied to the external optical modulator so as to minimize the amount of second order distortion measured in said measuring of the amount of second order distortion operation, said controlling of the bias voltage operation comprising detecting an amount of second order distortion included in the second of the two optical signals from the second port and caused by non-linearity of the external optical modulator, storing the amount of second order distortion detected in said detecting of the amount of second order distortion as a reference value in an initial state in which the bias voltage is applied to the external optical modulator so as to minimize the amount of second order distortion included in the optical signal outputted from the first port and caused by non-linearity of the external optical modulator, and controlling the bias voltage applied to said external optical modulator so that the amount of second order distortion detected in said detecting of the amount of second order distortion operation agrees with the reference value.

6. A method of controlling a bias voltage applied to an external optical modulator in an optical transmission apparatus, the external optical modulator being operable to modulate an optical carrier from a light source with an electrical signal, said method comprising:

measuring an amount of second order distortion included in an optical signal from the external optical modulator and caused by non-linearity of the external optical modulator;

and controlling the bias voltage applied to the external optical modulator so as to minimize the amount of second order distortion measured in said measuring of the amount of second order distortion operation, said controlling of the bias voltage operation comprising increasing or decreasing the bias voltage applied to the external optical modulator, and determining whether the second order distortion measured in said measuring of the amount of second order distortion operation is increased or decreased before and after said increasing or decreasing of the bias voltage, and based on a result of said determining operation, further determining whether to increase or decrease the bias voltage at a next time.

* * * * *